United States Patent [19]

Solow

[11] Patent Number: 4,970,884

[45] Date of Patent: Nov. 20, 1990

[54] STEERING WHEEL LOCK

[75] Inventor: Joseph E. Solow, Plainview, N.Y.

[73] Assignee: Wolo Manufacturing Corporation, Deer Park, N.Y.

[21] Appl. No.: 476,972

[22] Filed: Feb. 7, 1990

[51] Int. Cl.⁵ .......................................... B60R 25/02
[52] U.S. Cl. .................................... 70/209; 70/226
[58] Field of Search ................ 70/209, 207, 225, 226, 70/237

[56] References Cited

U.S. PATENT DOCUMENTS

| | | | |
|---|---|---|---|
| 1,448,658 | 3/1923 | Furber. | |
| 3,245,239 | 4/1966 | Zaidener | 70/202 |
| 3,462,982 | 8/1969 | Moore | 70/209 |
| 3,664,164 | 5/1972 | Zaidener | 70/202 |
| 3,742,743 | 7/1973 | Stoyanovitch | 70/209 |
| 4,103,524 | 8/1978 | Mitchell | 70/209 |
| 4,304,110 | 12/1981 | Fain | 70/209 |
| 4,738,127 | 4/1988 | Johnson | 70/209 |
| 4,750,341 | 6/1988 | Laguna | 70/209 |
| 4,848,110 | 7/1989 | Kuo | 70/38 C |
| 4,887,443 | 12/1989 | Wang | 70/209 |

FOREIGN PATENT DOCUMENTS

| | | |
|---|---|---|
| 402771 | 12/1967 | Australia. |
| 106072 | 8/1964 | Denmark. |
| 2718291 | 10/1978 | Fed. Rep. of Germany. |
| 1553905 | 12/1968 | France ................... 70/209 |
| 1127524 | 9/1968 | United Kingdom. |
| 1554593 | 10/1979 | United Kingdom. |
| 2024307 | 1/1980 | United Kingdom. |
| 2039840 | 8/1980 | United Kingdom. |

Primary Examiner—Robert L. Wolfe
Attorney, Agent, or Firm—Brumbaugh, Graves, Donohue & Raymond

[57] ABSTRACT

A steering wheel lock device comprises an elongate rod having a first hook member and a carriage member moveable on the rod carrying a second hook member. A lock mechanism on the carriage includes a ball which extends into a through passage on the carriage member to engage indentations on the rod. The ball is urged into the through passage by the action of a spring, which bears against a spring support mechanism, which moves between a locking position holding the ball into the indentation and an unlocking position wherein the ball moves against the spring.

12 Claims, 1 Drawing Sheet

STEERING WHEEL LOCK

BACKGROUND OF THE INVENTION

The present invention relates to locking devices for attachment to the steering wheel of a automobile and in particular to such devices which include an extended rod member which projects radially from the steering wheel, when the device is mounted thereon, to thereby prevent continuous rotation of the steering wheel and accordingly prevent operation of the vehicle.

The present invention is an improved construction and arrangement for steering wheel lock devices of the above referenced type, wherein a bar member is provided with a first steering wheel engaging hook, and a second engaging hook is mounted on a carriage member which moves along the bar member and can be lockingly secured to the bar member at various longitudinal positions to secure the device to a steering wheel.

It is an object of the present invention to provide such a steering wheel locking device which has increased strength and rigidity, which is easy and inexpensive to manufacture, and which is convenient to use.

SUMMARY OF THE INVENTION

In accordance with the invention there is provided a steering wheel lock device which includes an elongated rod having a detent rod portion and an extension rod portion. The first steering wheel engaging means, such as a hook, is attached in fixed position to the rod between the two rod portions. The detent rod portion is non-circular and includes a plurality of indentations spaced linearly along the rod portion The extension rod portion extends from the first steering wheel engaging means in a direction opposite to the detent rod portion by a distance which is selected to prevent continuous rotation of a steering wheel when the lock is mounted thereto. A carriage member is mounted on the detent portion and includes a through passage for non-rotatably receiving the detent portion of the rod. The carriage member includes a transverse passage which intersects the through passage and includes a spherical ball member mounted therein. The ball member partially extends into the through passage to thereby engage one of the indentations of the detent portion. A spring is provided for urging the ball member into the through passage. A spring support member in the transverse passage bears against the spring and is moveable from a first to a second spring support position against the force of the spring. A lock mechanism is provided for retaining the spring support member in the second position upon manual movement thereof and for releasing the spring support member from the second to the first position upon operation of the lock mechanism. The spring support member is arranged to compress the spring against the ball member in the second position to hold the ball in the through passage and thereby engage one of the indentations of the detent rod portion in the second position, preventing movement of the carriage on the detent rod portion, and to release the spring and permit movement of the ball member against the spring out of the through passage in the first position permitting longitudinal movement of the carriage in both directions on the detent portion of said rod between discrete positions corresponding to the indentations. The carriage includes a second steering wheel engaging means for engaging a portion of a vehicle steering wheel opposite to a portion engaged by the first engaging means.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
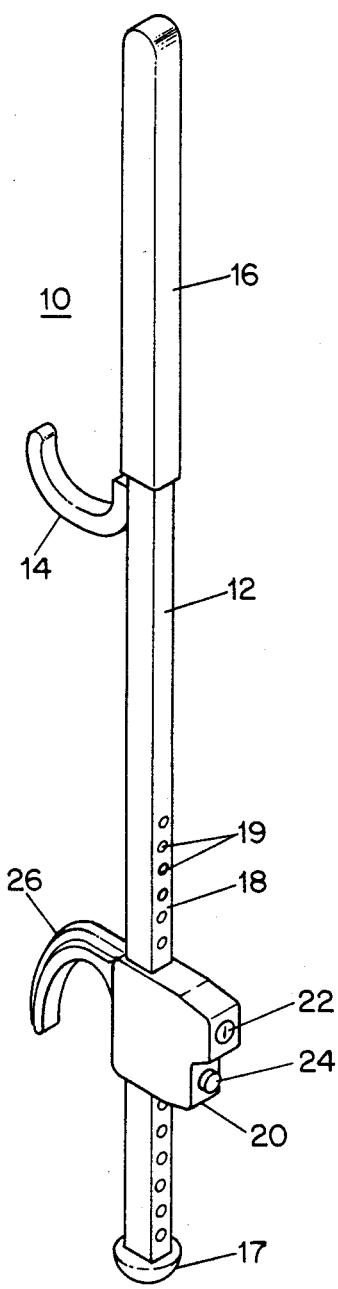
FIG. 1 is a perspective view of a steering wheel locking device according to the present invention.
Figure 4:
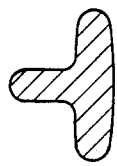
FIG. 4 is a cross-sectional view illustrating the preferred structure of hook member 26 of the FIG. 1 locking device.

FIG. 1 is a perspective view illustrating the overall arrangement of a preferred embodiment of a steering wheel locking device 10 according to the present invention. Locking device 10 includes a rod member 12, which in the illustrated embodiment comprises a straight, square rod having a cross-section of approximately ¾ inch and a length of approximately 26 inches. Rod 12 is preferably fabricated out of square steel bar stock, and for decorative purposes may be plated with a bright, non-corrosive metal, such as chromium. A first steering wheel engaging member, comprising hook 14 is connected to bar 12 preferably by welding. Hook 14 is also fabricated out of suitable steel bar stock which is formed into a hook shape and welded to bar 12 with adjoining flat surfaces of the two pieces mated to achieve a rigid welded connection. Rod 12 includes an extension rod portion 16 which has a length beyond hook 14 selected to prevent continued rotation of a vehicle steering wheel when locking device 10 is attached thereto. Extension rod portion 16 is preferably covered by a protective cover, such as a semi-rigid plastic sleeve, a rubber coating or a foam coating to prevent damage to decorative portions of the vehicle interior when an attempt is made to turn the steering wheel with locking device 10 attached thereto. Hook 14 is also preferably coated in protective material to prevent damage to the plastic portions of a vehicle steering wheel.

Rod 12 of locking device 10 further includes a detent rod portion 18 which includes a plurality of indentations 19 preferably hemispherical in shape and linearly spaced along the detent portion 18 of rod 12. A carriage member 20 includes a square through passage for receiving detent portion 18 and is arranged to move longitudinally along detent portion 18 and includes a second steering wheel engaging means comprising a hook 26. An end cap 17 is provided on the end of detent rod portion 18 to prevent damage to the vehicle interior and to retain carriage 20 on detent rod portion 18. Carriage member 20 includes a protruding button 24 for activating a locking mechanism to prevent continued movement of carriage 20 along detent portion 18 when the device 10 is attached to a steering wheel. A key operated lock cylinder 22 is provided for releasing button lock mechanism 24 to enable sliding of carriage 20 and removal of locking device 10 from a steering wheel.

Figure 2:
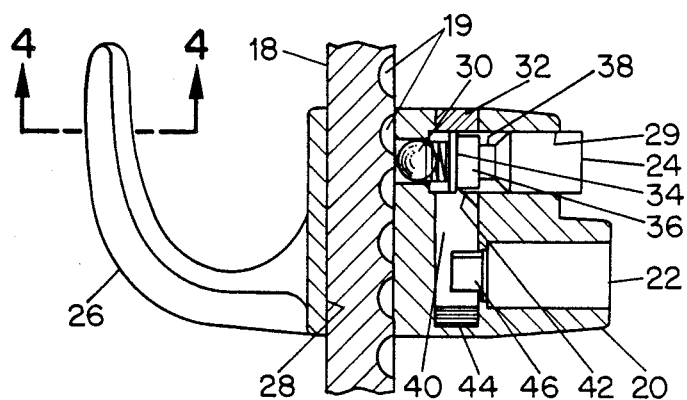
FIGS. 2 and 3 are cross-sectional drawings indicating the interior arrangement of the carriage member of the FIG. 1 locking device.
Figure 3:
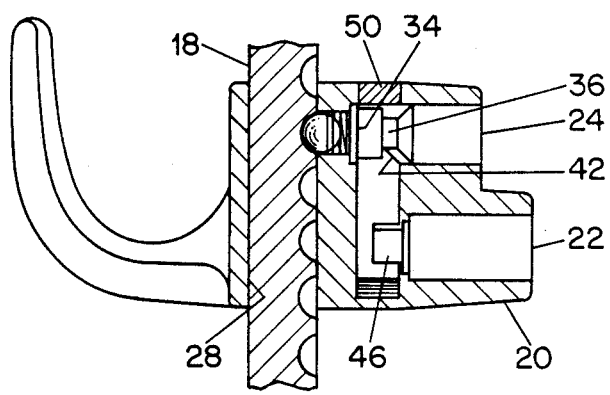

The interior arrangement of carriage 20 illustrating the operation of the locking device is shown in detail in FIGS. 2 and 3. Carriage 20 includes a non-circular, longitudinal passage 28 which in the illustrated embodiment is square and dimensioned to receive detent portion 18 of rod member 12 in a non-rotatable, sliding fit. A transverse passage 29 intersects passage 28 and includes a spherical ball member 30 which is urged into passage 28 by the action of a spring 32. It will be understood that spherical ball member 30 need only have a spherical surface on the portion thereof which projects into passage 28. Spring 32 bears against a spring support member comprising button 24. Button member 24, in the illustrated embodiment, includes a disk-like end portion 34, a cylindrical portion 36 of smaller diameter and a further portion 38 also cylindrical, but of still smaller diameter. The exterior portion of spring support member 24 closely fits within transverse passage 24, which is cylindrical in cross-section, and the spring support member 24 forms a projecting button member. The carriage mechanism also includes a sliding bolt member 40 which engages spring support member 24 with a pawl-like end 42 which acts against disk portion 34 and cylindrical portion 36. Bolt member 40 is urged toward spring support member 24 by spring 44 which in turn bears against the body of carriage 20. Lock cylinder 22 includes an off center cam member 46 on the inner end thereof. Cam member 46 extends into a transverse groove on bolt member 40 so that when lock cylinder 22 is turned by the action of a key, bolt member 40 is moved downwardly against spring 44 and away from spring support member 24.

When spring support member 24 is in the position shown in FIG. 2 wherein the button portion extends out of carriage 20, pawl end 42 of bolt 40 bears against disk portion 34 providing sufficient room for ball member 30 to compress spring 32 and permit carriage 20 to move in either direction along detent portion 18, resting in discrete positions corresponding to indentations 19. When ball member 30 is resting in one of indentation 19 spring support button member 24 may be depressed to the position shown in FIG. 3 wherein spring member 32 is compressed against ball 30 preventing ball 30 from moving out of passage 28. The activation of the button portion of spring support member 24 enables bolt member 40 to move upwardly under the action of spring 44 so that pawl end 42 engages cylindrical portion 36 of spring support member 24 as shown in FIG. 3. By holding ball 30 firmly into one indentation 19, carriage 20 is prevented from moving on detent rod portion 18.

When it is desired to remove the locking mechanism 10 from a steering wheel, rotation of lock cylinder 22 using a key causes off center cam mechanism 46 to move bolt 40 downwardly against spring 44 thereby disengaging pawl end 42 from cylindrical portion 36 and allowing spring support mechanism 24 to move outwardly under the influence of spring 32 to thereby place the lock mechanism in the initial unlocked condition of in FIG. 2.

Carriage 20 is easily assembled by inserting spring 44 and bolt 40 through the upper end of the bolt passage. Thereafter ball 30, spring 32 and spring support member 24 can be inserted through transverse passage 29 by depression of bolt 40 against spring 44. Lock cylinder 22 may then be inserted so that cam 46 engages bolt 40. Cover cap 50 is likewise inserted, for example, by press fit to close the bolt passage. Cover cap 50 and lock cylinder 22 can be conventionally secured, for example, by pins.

A major advantage of the lock mechanism shown in detail in FIGS. 2 and 3 is that the steering wheel locking device 10 can be applied to the steering wheel of a vehicle conveniently without use of a key. Use of the key is required only to unlock the locking device 10 by a snap action, after which carriage 20 can be moved on detent portion 18 to remove the device from the steering wheel by the vehicle's owner.

Figure 5:
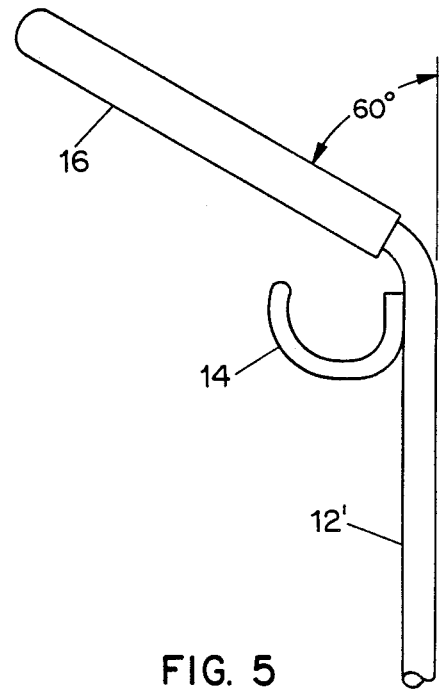
FIG. 5 is a plan side view of an alternate arrangement for the extension rod portion of the locking device illustrated in FIG. 1.

FIG. 5 show an alternate arrangement for the extension portion 16' of the locking device of the present invention. Extension 16' is formed by bending rod 12' through an angle of approximately 60° in the vicinity of hook 14 to thereby shape the lock device to a configuration which blocks a vehicle steering wheel from rotation by engaging the vehicle dashboard. This arrangement permits a shorter overall length than is required for the straight bar locking device 10, which must have sufficient extension portion length from the steering wheel to contact the vehicle windshield, seat or door.

While there have been described what are believed to be the preferred embodiments of the invention, those skilled in the art will recognize that other and further changes may be made thereto without departing from the spirit of the invention, and it is intended to claim such changes and modifications as fall within the true scope of the invention.

I claim:

1. A steering wheel lock device comprising:
   an elongated rod including a detent rod portion, an extension rod portion and first steering wheel engaging means attached to said rod between said rod portions, said detent rod portion comprising a non-circular rod and a plurality of indentations spaced linearly along said rod portion, said extension rod portion extending from said first engaging means in a direction opposite to said detent rod portion by a distance selected to prevent continuous rotation of a steering wheel when said lock is mounted thereon;
   and a carriage member mounted on said detent portion and including a through passage for non-rotatably receiving said detent portion of said rod, said carriage member including a transverse passage intersecting said through passage and having a spherical ball member mounted therein, said ball member partially extending into said through passage thereby to engage one of said indentations of said detent portion, said carriage further including a spring urging said ball member into said through passage, a spring support member in said transverse passage bearing against said spring and moveable from a first to a second spring support position against the force of said spring, and a lock mechanism for retaining said spring support member in said second position upon manual movement thereof and for releasing said spring support member from said second to said first position upon operation of said lock mechanism, said spring support member being arranged to compress said spring against said ball member in said second position to hold said ball in said through passage and thereby engage one of said indentations in said second position, preventing movement of said carriage on said detent rod portion, and to release said spring and permit movement of said ball member against said spring out of said through passage in said first position permitting longitudinal movement of said carriage in both directions on said detent portion of said rod member between discrete positions corresponding to said indentations, said carriage including second steering wheel engaging means for engaging a portion of a vehicle steering wheel opposite to a portion engaged by said first engaging means.

2. A lock device as specified in claim 1 wherein said spring support member includes an end portion extending out of said transverse passage in said first position and forming a button on the exterior of said carriage whereby said spring support member is moveable to said second position by depressing said button.

3. A lock device as specified in claim 2 wherein said spring support member includes first and second ridges engaging a pawl member in said first and second positions and wherein said lock mechanism comprises means for moving said pawl away from said spring support member whereby said pawl disengages said second ridge and allows said spring to move said support member to said first position.

4. A lock device as specified in claim 3 wherein said pawl member comprises a sliding pawl and wherein said lock mechanism includes a second spring urging said pawl member toward said spring support member and a lock cylinder having a cam member engaging said sliding pawl for moving said pawl against said second spring thereby to disengage said second ridge.

5. A lock device as specified in claim 1 wherein said first steering wheel engaging means comprises a first hook having an opening toward said extension rod portion and wherein said second steering wheel engaging means comprises a second hook having an opening facing away from said extension rod portion.

6. A lock device as specified in claim 1 wherein said detent rod portion and said through passage are rectangular and wherein said indentations are arranged on at least one surface of said rod.

7. A lock device as specified in claim 1 wherein said extension rod portion is formed at an angle to said detent rod portion to thereby engage the dashboard of a vehicle when the steering wheel is turned.

8. A steering wheel lock device comprising:
an elongated rod including a detent rod portion, an extension rod portion and first steering wheel engaging means attached to said rod, said detent rod portion comprising a non-circular rod and a plurality of indentations spaced linearly along said rod portion, said extension rod portion extending from the remaining portions of said rod by a distance selected to prevent continuous rotation of a steering wheel when said lock is mounted thereon;
and a carriage member mounted on said detent portion and including a through passage for non-rotatably receiving said detent portion of said rod, said carriage member including a transverse passage intersecting said through passage and having a spherical ball member mounted therein, said ball member partially extending into said through passage thereby to engage one of said indentations of said detent portion, said carriage further including a spring urging said ball member into said through passage, a spring support member in said transverse passage bearing against said spring and moveable from a first to a second spring support position against the force of said spring, and a lock mechanism for retaining said spring support member in said second position upon manual movement thereof and for releasing said spring support member from said second to said first position upon operation of said lock mechanism, said spring support member being arranged to compress said spring against said ball member in said second position to hold said ball in said through passage and thereby engage one of said indentations in said second position, preventing movement of said carriage on said detent rod portion, and to release said spring and permit movement of said ball member against said spring out of said through passage in said first position permitting longitudinal movement of said carriage in both directions on said detent portion of said rod member between discrete positions corresponding to said indentations, said carriage including second steering wheel engaging means for engaging a portion of a vehicle steering wheel opposite to a portion engaged by said first engaging means.

9. A lock device as specified in claim 1 wherein said extension rod portion is formed at an angle toward a steering wheel column from the remaining rod portions to thereby intersect a dash board of a vehicle when said device is attached to a vehicle steering wheel and said steering wheel is turned on.

10. The improvement specified in claim 9 wherein said angle is approximately 60°.

11. A lock device as specified in claim 8 wherein said extension rod portion is formed at an angle toward a steering wheel column from the remaining rod portions to thereby intersect a dash board of a vehicle when said device is attached to a vehicle steering wheel and said steering wheel is turned.

12. The improvement specified in claim 11 wherein said angle is approximately 60°

* * * * *